United States Patent
Jung et al.

(10) Patent No.: US 11,834,568 B2
(45) Date of Patent: Dec. 5, 2023

(54) LATEX COMPOSITION FOR DIP-FORMING, METHOD FOR PREPARING THE COMPOSITION AND ARTICLE FORMED BY THE COMPOSITION

(71) Applicant: LG Chem, Ltd., Seoul (KR)

(72) Inventors: Yong Seok Jung, Daejeon (KR); Won Sang Kwon, Daejeon (KR); Ji Hyun Kim, Daejeon (KR); Seung Whan Oh, Daejeon (KR)

(73) Assignee: LG Chem, Ltd.

( * ) Notice: Subject to any disclaimer, the term of this patent is extended or adjusted under 35 U.S.C. 154(b) by 613 days.

(21) Appl. No.: 16/978,084

(22) PCT Filed: Dec. 12, 2019

(86) PCT No.: PCT/KR2019/017619
§ 371 (c)(1),
(2) Date: Sep. 3, 2020

(87) PCT Pub. No.: WO2020/122647
PCT Pub. Date: Jun. 18, 2020

(65) Prior Publication Data
US 2021/0017362 A1      Jan. 21, 2021

(30) Foreign Application Priority Data
Dec. 13, 2018   (KR) .................. 10-2018-0161343
Dec. 9, 2019    (KR) .................. 10-2019-0162685

(51) Int. Cl.
*C08L 13/02* (2006.01)
*C08J 5/02* (2006.01)
*C08J 3/09* (2006.01)

(52) U.S. Cl.
CPC ............... *C08L 13/02* (2013.01); *C08J 3/09* (2013.01); *C08J 5/02* (2013.01); *C08J 2313/02* (2013.01); *C08J 2433/10* (2013.01); *C08J 2471/12* (2013.01)

(58) Field of Classification Search
CPC ...... C08L 13/02; C08J 3/09; C08J 5/02; C08J 2433/10; C08J 2471/12; C08J 2313/02
See application file for complete search history.

(56) References Cited

U.S. PATENT DOCUMENTS

| 2001/0034428 A1* | 10/2001 | Destarac ............... C09K 23/00 528/392 |
| 2005/0154122 A1* | 7/2005 | Ota .................... C08F 236/12 524/804 |
| 2009/0105383 A1 | 4/2009 | Davis et al. |
| 2009/0186968 A1 | 7/2009 | Zong et al. |
| 2012/0149859 A1 | 6/2012 | Yang et al. |
| 2016/0340526 A1 | 11/2016 | Luebke et al. |
| 2021/0087371 A1* | 3/2021 | Kwon .................. A41D 19/00 |

FOREIGN PATENT DOCUMENTS

| JP | 2014145031 A | * | 8/2014 |
| JP | 2014145031 A |   | 8/2014 |
| JP | 2015214696 A |   | 12/2015 |
| KR | 20100133638 A |   | 12/2010 |
| KR | 20110110778 A |   | 10/2011 |
| KR | 20150019007 A |   | 2/2015 |
| KR | 20170041092 A |   | 4/2017 |
| KR | 20170047880 A |   | 5/2017 |
| KR | 20170081839 A |   | 7/2017 |
| KR | 101811343 B1 |   | 12/2017 |
| KR | 20180093763 A |   | 8/2018 |

OTHER PUBLICATIONS

Machine translation of JP 2014145031 by Hashimoto. (Year: 2014).*
Scifinder Abstract of JP 2014145031 by Hashimoto. (Year: 2014).*
Fordyce, D.B. et al. Alkali-Soluble Acrylic Emulsions. Industrial and Engineering Chemistry. vol. 51, No. 2. pp. 115. 1959. (Year: 1959).*
International Search Report for Application No. PCT/KR2019/017619, dated Apr. 2, 2020, pp. 1-3.

* cited by examiner

*Primary Examiner* — Michael M Dollinger
*Assistant Examiner* — Christina H. W. Rosebach
(74) *Attorney, Agent, or Firm* — Lerner David LLP

(57) ABSTRACT

A latex composition for dip forming, and more particularly, to a latex composition for dip forming includes carboxylic acid-modified nitrile-based copolymer latex; and a phenolic emulsifier, wherein the phenolic emulsifier is included in an amount of 0.08 parts by weight to 6 parts by weight (based on a solid content) based on 100 parts by weight of the carboxylic acid-modified nitrile-based copolymer latex. A method for preparing the latex composition and a formed article produced using the latex composition are also provided.

10 Claims, No Drawings

LATEX COMPOSITION FOR DIP-FORMING, METHOD FOR PREPARING THE COMPOSITION AND ARTICLE FORMED BY THE COMPOSITION

CROSS-REFERENCE TO RELATED APPLICATIONS

The present application is a national phase entry under U.S.C. § 371 of International Application No. PCT/KR2019/017619, filed Dec. 12, 2019, which claims the benefit of priorities to Korean Patent Application No. 10-2018-0161343, filed on Dec. 13, 2018, and Korean Patent Application No. 10-2019-0162685, filed on Dec. 9, 2019, all of which are incorporated herein by reference.

TECHNICAL FIELD

The present invention relates to a latex composition for dip forming, and more particularly, to a latex composition for dip forming, a method for preparing the composition, and a article formed by the composition.

BACKGROUND ART

A disposable rubber glove is increasingly used in various fields such as housework, food industries, electronic industries, and medical industries. In the past, the disposable rubber glove has been made by dip forming natural rubber latex. However, the disposable rubber glove caused an allergic reaction to a protein such as pain or a rash on some users. Due to such problems, recently, a disposable rubber glove made by dip forming nitrile-based latex instead of natural rubber latex has been spotlighted.

Recently, glove manufacturers that manufacture a nitrile-based rubber glove produced using nitrile-based latex are constantly trying to increase productivity and to reduce a rate of defects. One of the methods for reducing the rate of defects in a glove is a method of producing a glove by double dip forming. However, when the double dip forming method is used, a syneresis phenomenon occurs in the article formed by primary dip forming, and the stability of latex is thus reduced when the article formed by the primary dip forming is subjected to secondary dip forming. When the stability of the latex composition is low, coagulation (agglutination, flocculation, agglomeration, or coalescence) is generated to cause precipitation at a lower part of latex, and the coagulation is attached to the dip formed article finally produced, or pinholes are generated by the coagulation, which increases a rate of defects. Therefore, a tensile strength and elongation property of a latex glove which is a final product are reduced.

Meanwhile, one of the considerations of a user when using a glove is wearing comfort. However, in the case of the nitrile-based rubber glove, wearing comfort is not good due to a relatively high modulus as compared to that of a glove formed of natural rubber.

Therefore, a latex composition for dip forming that may solve the syneresis problem in a production process of a glove and implement wearing comfort of a formed article due to a low modulus is required.

DISCLOSURE

Technical Problem

In order to solve the problems mentioned in the background art, an object of the present invention is to increase syneresis time to thereby improve the stability of a latex composition for dip forming at the time of performing dip forming by using the latex composition for dip forming, and to maintain physical properties of a dip formed article such as a glove produced using the latex composition for dip forming at an equivalent or higher level.

That is, the object of the present invention is to provide a latex composition for dip forming prepared by adding a phenolic emulsifier at the time of preparing a carboxylic acid-modified nitrile-based copolymer latex composition to implement an increase of syneresis time for an improved stability of the latex composition for dip forming at the time of performing dip forming and an improved tensile strength of a dip formed article such as a glove produced using the latex composition for dip forming, and to implement a low modulus for improved wearing comfort of the dip formed article, a method for preparing the same, and a dip formed article produced using the same.

Technical Solution

In one general aspect, there is provided a latex composition for dip forming including carboxylic acid-modified nitrile-based copolymer latex; and a phenolic emulsifier, wherein the phenolic emulsifier is included in an amount of 0.08 parts by weight to 6 parts by weight (based on a solid content) based on 100 parts by weight of the carboxylic acid-modified nitrile-based copolymer latex.

In another general aspect, there is provided a method for preparing a latex composition for dip forming, the method including: a step (S10) of preparing carboxylic acid-modified nitrile-based copolymer latex; and a step (S20) of mixing the prepared carboxylic acid-modified nitrile-based copolymer latex with a phenolic emulsifier, wherein in the step (S20), the phenolic emulsifier is mixed in an amount of 0.08 parts by weight to 6 parts by weight based on 100 parts by weight of the carboxylic acid-modified nitrile-based copolymer latex.

In still another general aspect, there is provided a formed article including a layer derived from a latex composition for dip forming.

Advantageous Effects

According to the present invention, since the latex composition for dip forming has an improved stability due to the increase of the syneresis time, in a case where a dip formed article such as a glove is produced using the latex composition for dip forming, it is possible to implement an excellent workability, an excellent tensile strength of the dip formed article, and an improved wearing comfort of the dip formed article due to the low modulus.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

Hereinafter, the present invention will be described in more detail to assist in understanding the present invention.

The term "monomer-derived repeating unit" in the present invention may refer to a component or a structure derived from a monomer, or a material itself, and as a specific example, may refer to a repeating unit formed in a polymer by the added monomer participating in a polymerization reaction at the time of polymerization of the polymer.

The term "latex" in the present invention may mean that a polymer or a copolymer polymerized by polymerization is dispersed in water, and as a specific example, may mean that fine particles of a rubber-like polymer or a rubber-like copolymer polymerized by emulsion polymerization are dispersed in water in a colloid state.

The term "layer derived" in the present invention may refer to a layer formed of a polymer or a copolymer, and as a specific example, may refer to a layer formed of a polymer or a copolymer by attachment, fixing, and/or polymerization of the polymer or the copolymer on a dip mold when a dip formed article is produced.

The term "cross-linking part derived from a cross-linking agent" may refer to a component or a structure derived from a compound, or a material itself, and may refer to a cross-linking part for cross-linking in a polymer or between polymers, the polymer being formed by an action and reaction of a composition of the cross-linking agent.

The term "alkyl" in the present invention may refer to a linear or branched saturated monovalent hydrocarbon of carbon atoms, such as methyl, ethyl, propyl, 2-propyl, n-butyl, iso-butyl, tert-butyl, pentyl, hexyl, or dodecyl, and may include alkyl substituted with a substituent as well as unsubstituted alkyl.

The term "cycloalkyl" in the present invention may refer to the alkyl group defined above in which one or more hydrogen atoms are substituted with a saturated or unsaturated nonaromatic monovalent monocyclic, bicyclic, or tricyclic hydrocarbon, such as cyclopropyl, cyclobutyl, cyclopentyl, cyclopentenyl, cyclohexyl, cyclohexenyl, cycloheptyl, cyclooctyl, decahydronaphthalenyl, adamantanyl, or norbornyl (that is, bicyclo[2,2,1]hept-5-enyl), and may include cycloalkyl substituted with a substituent as well as unsubstituted cycloalkyl.

The term "aryl" in the present invention may refer to the alkyl group defined above in which one or more hydrogen atoms are substituted with an aryl group, such as phenyl, naphthalenyl, or fluorenyl, and may include aryl substituted with a substituent as well as unsubstituted aryl.

The term "alkenyl" in the present invention may refer to a linear or branched monovalent hydrocarbon of carbon atoms such as ethenyl, 1-propenyl, 2-propenyl, 2-butenyl, 3-butenyl, pentenyl, 5-hexenyl, or dodecenyl. The alkenyl may be bonded via a carbon atom including a carbon-carbon double bond or via a saturated carbon atom and may include alkenyl substituted with a substituent as well as unsubstituted alkenyl.

The term "(meth)acrylate" in the present invention may refer to both "acrylate" and "methacrylate".

A latex composition for dip forming according to the present invention may include carboxylic acid-modified nitrile-based copolymer latex and a phenolic emulsifier.

According to an exemplary embodiment of the present invention, the phenolic emulsifier may be represented by the following Formula 1.

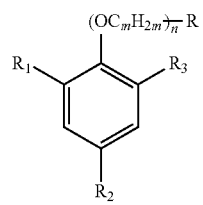

[Formula 1]

In Formula 1, $R_1$, $R_2$, and $R_3$ are each independently hydrogen, or substituted or unsubstituted linear or branched alkyl having 1 to 30 carbon atoms, 1 to 20 carbon atoms, or 1 to 10 carbon atoms; at least one of $R_1$ to $R_3$ is substituted or unsubstituted linear or branched alkyl having 1 to 30 carbon atoms; R is hydrogen, a polymerizable functional group, an alkoxy group having 1 to 30 carbon atoms, 1 to 20 carbon atoms, or 1 to 10 carbon atoms, an inorganic or organic salt, a nonionic group, or halogen; m is an integer of 1 to 20, 1 to 10, or 1 to 5; and n is an integer of 1 to 100, 4 to 80, or 8 to 25.

A substituent substitutable for the linear or branched alkyl may be one or more selected from the group consisting of linear or branched alkyl having 1 to 30 carbon atoms, 1 to 20 carbon atoms, or 1 to 10 carbon atoms; cycloalkyl having 3 to 30 carbon atoms, 3 to 20 carbon atoms, or 6 to 10 carbon atoms; aryl having 6 to 30 carbon atoms, 6 to 20 carbon atoms, or 6 to 10 carbon atoms; and halogen.

The alkyl may be methyl, ethyl, propyl, 2-propyl, butyl, isobutyl, tert-butyl, pentyl, hexyl, dodecyl, or the like.

The cycloalkyl may be cyclopropyl, cyclobutyl, cyclopentyl, cyclopentenyl, cyclohexyl, cyclohexenyl, cycloheptyl, cyclooctyl, decahydronaphthalenyl, adamantanyl, norbornyl (that is, bicyclo[2,2,1]hept-5-enyl), or the like.

The aryl may be phenyl, naphthalenyl, fluorenyl, or the like.

The polymerizable functional group may be one or more selected from the group consisting of (meth)acrylate, alkyl (meth)acrylate having 1 to 30 carbon atoms, 1 to 20 carbon atoms, or 1 to 10 carbon atoms, and alkenyl (meth)acrylate having 2 to 30 carbon atoms, 2 to 20 carbon atoms, or 2 to 10 carbon atoms.

The alkoxy group may be methoxy, ethoxy, protoxy, isobutylmethoxy, butoxy, or the like.

The inorganic or organic salt may be phosphonate ($—PO_3$-$M^+$), phosphate ($PO_4$-$M^+$), sulfate ($SO_4$-$M^+$), sulfonate ($SO_3^-M^+$), carboxylate ($COO$-$M^+$), or the like. Here, $M^+$ may be $H^+$, $Na^+$, $NH_4^+$, $K^+$, $Li^+$, or the like.

The nonionic group may be a hydroxyl group (—OH), a cyano group (—CN), a carboxylic acid group (—COOH), an amide group (—$CONH_2$), or the like.

The halogen may be F, Cl, Br, I, or the like.

As a specific example, $R_1$, $R_2$, and $R_3$ may be each independently hydrogen, butyl, tert-butyl, iso-butyl,

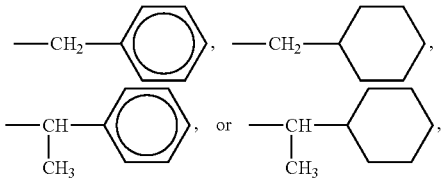

or the like.

According to an exemplary embodiment of the present invention, the phenolic emulsifier may be represented by the following Formula 2.

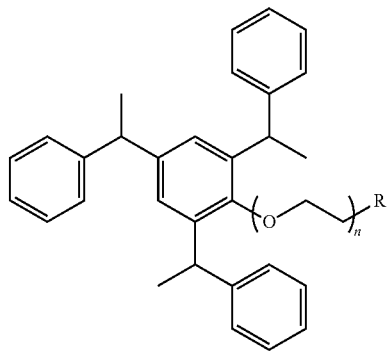

[Formula 2]

In Formula 2, R is hydrogen, a polymerizable functional group, an alkoxy group having 1 to 10 carbon atoms, an inorganic or organic salt, a nonionic group, or halogen; and n is an integer of 1 to 100, 4 to 80, or 8 to 25.

The polymerizable functional group may be one or more selected from the group consisting of (meth)acrylate, alkyl (meth)acrylate having 1 to 30 carbon atoms, 1 to 20 carbon atoms, or 1 to 10 carbon atoms, and alkenyl (meth)acrylate having 2 to 30 carbon atoms, 2 to 20 carbon atoms, or 2 to 10 carbon atoms.

The alkyl (meth)acrylate may be methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth) acrylate, or the like.

The alkenyl (meth)acrylate may be vinyl (meth)acrylate, allyl (meth) acrylate, 1,1-dimethylpropenyl (meth) acrylate, 3,3-dimethylbutenyl (meth)acrylate, or the like.

As another example, the polymerizable functional group may be one or more selected from the group consisting of acrylo, methacrylo, acrylamido, methacrylamido, diallylamino, allyl ether, vinyl ether, α-alkenyl, maleimido, styrenyl, and α-alkyl styrenyl groups.

A content (based on a solid content) of the phenolic emulsifier may be 0.06 parts by weight to 7 parts by weight, 0.08 parts by weight to 6 parts by weight, 0.1 parts by weight to 5.5 parts by weight, or 0.1 parts by weight to 4 parts by weight, based on 100 parts by weight (based on a solid content) of the carboxylic acid-modified nitrile-based copolymer latex. Within this range, the stability of the latex composition for dip forming is improved due to an increase of syneresis time of the latex composition for dip forming, and a formed article produced using the latex composition for dip forming has an excellent wearing comfort due to a low modulus.

A number average molecular weight of the phenolic emulsifier may be 200 g/mol to 50,000 g/mol, 250 g/mol to 30,000 g/mol, or 300 g/mol to 20,000 g/mol. Within this range, the stability of the carboxylic acid-modified nitrile-based copolymer latex is improved due to an excellent dispersion in a solvent, the stability of the latex composition for dip forming is improved due to an increase of syneresis time of the latex composition for dip forming, and a formed article produced using the latex composition for dip forming has an excellent wearing comfort due to a low modulus.

According to an exemplary embodiment of the present invention, the phenolic emulsifier may be easily dissolved, mixed, and dispersed in water because it has a hydrophilic group, and the phenolic emulsifier may improve the stability of the latex because it is fixed on a surface of the particle in the latex.

Meanwhile, in a case where the phenolic emulsifier has a bulky benzene ring as well as the hydrophilic group as in a phenolic emulsifier represented by Formula 2, the phenolic emulsifier serves to delay a film formation, such that the syneresis time is increased when a formed article is produced using a composition for dip forming including the phenolic emulsifier.

In addition, according to an exemplary embodiment of the present invention, the phenolic emulsifier included in the latex composition for dip forming may be an emulsifier additionally added to and mixed with the prepared carboxylic acid-modified nitrile-based copolymer at the time of preparing a latex composition for dip forming, rather than a component derived at the time of preparing a carboxylic acid-modified nitrile-based copolymer. The phenolic emulsifier may be different from an emulsifier to be added at the time of preparing a carboxylic acid-modified nitrile-based copolymer.

According to an exemplary embodiment of the present invention, the phenolic emulsifier included in the latex composition for dip forming is mixed with the prepared carboxylic acid-modified nitrile-based copolymer latex, such that the syneresis time of the produced dip formed article is increased, and a stress (modulus) of the produced dip formed article is improved. On the other hand, unlike the present invention, in a case where the latex composition for dip forming includes a phenolic emulsifier added as an emulsifier at the time of preparing carboxylic acid-modified nitrile-based copolymer latex, particles in the carboxylic acid-modified nitrile-based copolymer latex are prepared to be small in size, which causes a reduction of the syneresis time.

According to an exemplary embodiment of the present invention, the latex composition for dip forming may further include an alkali soluble emulsion (ASE) thickener.

The ASE thickener may be a copolymer including an ethylenically unsaturated acid monomer-derived repeating unit and an ethylenically unsaturated acid ester monomer-derived repeating unit. For example, the ASE thickener may be represented by the following Formula 3.

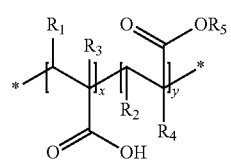

[Formula 3]

In Formula 3, $R_1$ to $R_5$ each independently represent hydrogen, an alkyl group having 1 to 4 carbon atoms, an alkoxy group having 1 to 3 carbon atoms, an aryl group having 6 to 12 carbon atoms, and a heteroaryl group having 2 to 6 carbon atoms, ester group, carboxyl group, sulfonic acid group, or acid anhydride group; and x and y are each independently an integer selected from 1 to 10000.

In addition, "*" may refer to a linking position between the repeating units or an end group in a copolymer. In a case where "*" is an end group of the copolymer, "*" may be hydrogen or an alkyl group having 1 to 4 carbon atoms.

More specifically, in Formula 3, $R_1$ and $R_2$ each independently represent hydrogen; $R_3$ and $R_4$ each independently represent hydrogen or a methyl group; $R_5$ represents an alkyl group having 1 to 4 carbon atoms; and x and y are each independently an integer selected from 10 to 1000.

In addition, according to an exemplary embodiment of the present invention, Formula 3 is represented by describing the repeating units repeated by the integers of x and y in order for the convenience of description. However, the copolymer represented by Formula 3 is not limited to a block copolymer in which the respective repeating units repeated by the integers of x and y form blocks in order, and may include a random copolymer in which the repeating units repeated by the integers of x and y are randomly distributed in the copolymer.

The ethylenically unsaturated acid monomer is an ethylenically unsaturated acid monomer including an acid group such as a carboxylic group, a sulfonic acid group, or an acid anhydride group, and may include one or more selected from the group consisting of polycarboxylic acid anhydride, an ethylenically unsaturated sulfonic acid monomer, and an ethylenically unsaturated polycarboxylic acid partial ester monomer. As an example, the ethylenically unsaturated carboxylic acid monomer may include one or more selected from the group consisting of an acrylic acid, a methacrylic acid, an itaconic acid, a maleic acid, and a fumaric acid. The polycarboxylic acid anhydride may include one or more selected from the group consisting of maleic anhydride and citraconic anhydride. The ethylenically unsaturated sulfonic acid monomer may include a styrene sulfonic acid. The ethylenically unsaturated polycarboxylic acid partial ester monomer may include one or more selected from the group consisting of monobutyl fumarate, monobutyl maleate, and mono-2-hydroxy propyl maleate. As a specific example, the ethylenically unsaturated acid monomer may be one or more selected from the group consisting of an acrylic acid, a methacrylic acid, an itaconic acid, a maleic acid, and a fumaric acid, and as a more specific example, the ethylenically unsaturated acid monomer may be a methacrylic acid.

The ethylenically unsaturated acid ester monomer may include one or more selected from the group consisting of methyl acrylate, ethyl acrylate, propyl acrylate, and butyl acrylate. As a more specific example, the ethylenically unsaturated acid ester monomer may be ethyl acrylate.

A weight average molecular weight of the copolymer included in the ASE thickener may be 500 g/mol to 2,000,000 g/mol. For example, the weight average molecular weight of the copolymer included in the ASE thickener may be 15,000 g/mol to 100,000 g/mol, or 20,000 g/mol to 100,000 g/mol. The weight average molecular weight of the copolymer included in the ASE thickener is within the above range, such that a stable latex composition for dip forming may be prepared.

A content (based on a solid content) of the ASE thickener may be 0.01 parts by weight to 1.5 parts by weight, 0.05 parts by weight to 1.0 part by weight, or 0.08 parts by weight to 0.5 parts by weight, based on 100 parts by weight (based on a solid content) of the carboxylic acid-modified nitrile-based copolymer latex. Within this range, a viscosity of the composition is increased to improve workability, and physical properties and quality of the dip formed article produced using the composition may also be improved.

In addition, according to an exemplary embodiment of the present invention, a solid concentration of the ASE thickener may be 5 wt % to 15 wt %. For example, the solid concentration of the ASE thickener may be 7 wt % to 13 wt %, 8 wt % to 12 wt %, or 9 wt % to 11 wt %. In a case where the ASE thickener having the solid concentration in the above range is mixed with the carboxylic acid-modified nitrile-based copolymer latex to prepare a latex composition for dip forming, the ASE thickener has an excellent stability with the carboxylic acid-modified nitrile-based copolymer latex, and may be mixed well without aggregation.

According to an exemplary embodiment of the present invention, a carboxylic acid-modified nitrile-based copolymer in the carboxylic acid-modified nitrile-based copolymer latex may include a conjugated diene-based monomer-derived repeating unit, an ethylenically unsaturated nitrile-based monomer-derived repeating unit, and an ethylenically unsaturated acid monomer-derived repeating unit.

According to an exemplary embodiment of the present invention, a conjugated diene-based monomer forming the conjugated diene-based monomer-derived repeating unit may be one or more selected from the group consisting of 1,3-butadiene, 2,3-dimethyl-1,3-butadiene, 2-ethyl-1,3-butadiene, 1,3-pentadiene, and isoprene, as a specific example, may be 1,3-butadiene or isoprene, and as a more specific example, may be 1,3-butadiene.

A content of the conjugated diene-based monomer-derived repeating unit may be 40 wt % to 89 wt %, 45 wt % to 80 wt %, or 50 wt % to 78 wt %, with respect to a total content of the carboxylic acid-modified nitrile-based copolymer. Within this range, the dip formed article produced using the latex composition for dip forming including the carboxylic acid-modified nitrile-based copolymer is flexible, has an excellent tactile sensation and wearing comfort, and also has an excellent oil resistance and tensile strength.

In addition, according to an exemplary embodiment of the present invention, an ethylenically unsaturated nitrile-based monomer forming the ethylenically unsaturated nitrile-based monomer-derived repeating unit may be one or more selected from the group consisting of acrylonitrile, methacrylonitrile, fumaronitrile, α-chloronitrile, and α-cyano ethyl acrylonitrile, as a specific example, may be acrylonitrile and methacrylonitrile, and as a more specific example, may be acrylonitrile.

A content of the ethylenically unsaturated nitrile-based monomer-derived repeating unit may be 10 wt % to 50 wt %, 15 wt % to 45 wt %, or 20 wt % to 40 wt %, with respect to the total content of the carboxylic acid-modified nitrile-based copolymer. Within this range, the dip formed article produced using the latex composition for dip forming including the carboxylic acid-modified nitrile-based copolymer is flexible, has an excellent tactile sensation and wearing comfort, and also has an excellent oil resistance and tensile strength.

In addition, according to an exemplary embodiment of the present invention, the ethylenically unsaturated acid monomer forming the ethylenically unsaturated acid monomer-derived repeating unit may be an ethylenically unsaturated monomer including an acid group such as a carboxylic group, a sulfonic acid group, or an acid anhydride group. As a specific example, the ethylenically unsaturated acid monomer may be one or more selected from the group consisting of an ethylenically unsaturated acid monomer such as an acrylic acid, a methacrylic acid, an itaconic acid, a maleic acid, or a fumaric acid; polycarboxylic acid anhydride such as maleic anhydride or citraconic anhydride; an ethylenically unsaturated sulfonic acid monomer such as a styrene sulfonic acid; and an ethylenically unsaturated polycarboxylic acid partial ester monomer such as monobutyl fumarate, monobutyl maleate, or mono-2-hydroxy propyl maleate. As a more specific example, the ethylenically unsaturated acid monomer may be one or more selected from the group consisting of an acrylic acid, a methacrylic acid, an itaconic acid, a maleic acid, and a fumaric acid. As a still more specific example, the ethylenically unsaturated acid monomer may be a methacrylic acid. The ethylenically unsaturated acid monomer may be used in a form of a salt such as an alkali metal salt or an ammonium salt, at the time of polymerization.

A content of the ethylenically unsaturated acid monomer-derived repeating unit may be 0.1 wt % to 15 wt %, 0.5 wt % to 9 wt %, or 1 wt % to 8 wt %, with respect to the total content of the carboxylic acid-modified nitrile-based copolymer. Within this range, the dip formed article produced using the latex composition for dip forming including the carboxylic acid-modified nitrile-based copolymer is flexible, has an excellent tactile sensation and wearing comfort, and also has an excellent resistance and tensile strength.

According to an exemplary embodiment of the present invention, the carboxylic acid-modified nitrile-based copolymer latex may selectively further include an ethylenically unsaturated monomer-derived repeating unit, in addition to the conjugated diene-based monomer-derived repeating unit, the ethylenically unsaturated nitrile-based monomer-derived repeating unit, and the ethylenically unsaturated acid monomer-derived repeating unit.

An ethylenically unsaturated monomer forming the ethylenically unsaturated monomer-derived repeating unit may be one or more selected from the group consisting of a vinyl aromatic monomer selected from the group consisting of styrene, aryl styrene, and vinyl naphthalene; fluoroalkyl vinyl ether such as fluoroethyl vinyl ether; an ethylenically unsaturated amide monomer selected from the group consisting of (meth)acrylamide, N-methylol (meth)acrylamide, N,N-dimethylol (meth) acrylamide, N-methoxy methyl (meth)acrylamide, and N-propoxy methyl(meth)acrylamide; a non-conjugated diene monomer such as vinyl pyridine, vinyl norbornene, dicyclo pentadiene, or 1,4-hexadiene; and an ethylenically unsaturated carboxylic acid ester monomer selected from the group consisting of methyl (meth)acrylate, ethyl (meth)acrylate, butyl (meth) acrylate, 2-ethylhexyl (meth) acrylate, trifluoroethyl (meth) acrylate, tetrafluoropropyl (meth) acrylate, dibutyl maleate, dibutyl fumarate, diethyl maleate, methoxymethyl (meth)acrylate, ethoxyethyl (meth) acrylate, methoxyethoxyethyl (meth) acrylate, cyanomethyl (meth) acrylate, 2-cyanoethyl (meth) acrylate, 1-cyanopropyl (meth) acrylate, 2-ethyl-6-cyanohexyl (meth) acrylate, 3-cyanopropyl (meth)acrylate, hydroxyethyl (meth)acrylate, hydroxypropyl (meth)acrylate, glycidyl (meth)acrylate, and dimethylamino ethyl(meth)acrylate.

A content of the ethylenically unsaturated monomer-derived repeating unit may be 20 wt % or less, 0.01 wt % to 20 wt %, or 0.01 wt % to 15 wt %, with respect to the total content of the carboxylic acid-modified nitrile-based copolymer. Within this range, the dip formed article produced using the latex composition for dip forming including the carboxylic acid-modified nitrile-based copolymer has an excellent tactile sensation and wearing comfort, and also has an excellent tensile strength.

According to an exemplary embodiment of the present invention, a glass transition temperature of the carboxylic acid-modified nitrile-based copolymer latex may be −50° C. to −15° C., −47° C. to −15° C., or −45° C. to −20° C. Within this range, the dip formed article has an excellent wearing comfort due to a low stickiness while preventing deterioration of a tensile property such as a tensile strength and cracks of the dip formed article produced using the latex composition for dip forming including the carboxylic acid-modified nitrile-based copolymer latex. The glass transition temperature may be measured by differential scanning calorimetry.

In addition, according to an exemplary embodiment of the present invention, an average particle size of the particles of the carboxylic acid-modified nitrile-based copolymer in the carboxylic acid-modified nitrile-based copolymer latex may be 50 nm to 500 nm, 80 nm to 300 nm, or 100 nm to 150 nm. Within this range, the carboxylic acid-modified nitrile-based copolymer latex may be prepared at a high concentration because a viscosity of the carboxylic acid-modified nitrile-based copolymer latex is not increased, and the dip formed article produced using the latex composition for dip forming including the carboxylic acid-modified nitrile-based copolymer latex has an excellent tensile property such as a tensile strength. In addition, within the above range, a rate of a film formation is excellent, and syneresis properties are thus excellent. The average particle size may be measured with a laser scattering analyzer (Nicomp).

In addition, according to an exemplary embodiment of the present invention, the latex composition for dip forming may further include an additive such as a vulcanizing agent, an ionic cross-linking agent, a pigment, a vulcanization catalyst, a filler, or a pH adjuster.

In addition, according to an exemplary embodiment of the present invention, as an example, a solid content (concentration) of the latex composition for dip forming may be 5 wt % to 40 wt %, 8 wt % to 35 wt %, or 10 wt % to 33 wt %.

Within this range, the transport efficiency of latex is excellent, and a storage stability of latex is excellent due to prevention of an increase of the viscosity of latex.

As another example, a pH of the latex composition for dip forming may be 8 to 12, 9 to 11, or 9.3 to 11, and within this range, processability and productivity are excellent at the time of production of the dip formed article. The pH of the latex composition for dip forming may be adjusted by addition of the pH adjuster described above. As an example, the pH adjuster may be a 1 wt % to 5 wt % aqueous potassium hydroxide solution, or a 1 wt % to 5 wt % ammonia solution.

Meanwhile, a method for preparing a latex composition for dip forming according to the present invention may include a step (S10) of preparing carboxylic acid-modified nitrile-based copolymer latex; and a step (S20) of mixing the prepared carboxylic acid-modified nitrile-based copolymer latex with a phenolic emulsifier.

That is, the method for preparing a latex composition for dip forming according to the present invention may include a step of polymerizing a monomer mixture including a conjugated diene-based monomer, an ethylenically unsaturated nitrile-based monomer, and an ethylenically unsaturated acid monomer to prepare carboxylic acid-modified nitrile-based copolymer latex including a carboxylic acid-modified nitrile-based copolymer; and a step of adding and mixing a phenolic emulsifier to the prepared carboxylic acid-modified nitrile-based copolymer latex.

According to an exemplary embodiment of the present invention, in the step (S20), an alkali soluble emulsion (ASE) thickener may be further included. That is, in the step (S20), a phenolic emulsifier and an alkali soluble emulsion (ASE) thickener may be added and mixed to the prepared carboxylic acid-modified nitrile-based copolymer latex. In this case, the type and content of the ASE thickener may be the same as mentioned above. According to an exemplary embodiment of the present invention, the polymerization of the carboxylic acid-modified nitrile-based copolymer may be performed by emulsion polymerization. The polymerization may be performed by polymerization of the monomer mixture, and the respective monomers to be included in the monomer mixture may be added in the type and content of the monomer described above, and may be added at the same time or separately added.

Meanwhile, the polymerization may be performed by adding the monomer mixture to a polymerization reactor all at once prior to the polymerization, or may be performed by adding a part of the monomer mixture to a polymerization reactor first and then adding the remaining monomer mixture to the polymerization reactor after the polymerization is initiated. As described above, in the case where the monomer mixture is separately added, when the monomer-derived repeating unit is formed from the respective monomers in the carboxylic acid-modified nitrile-based copolymer, distribution of the monomers by a difference in reaction rate of each monomer may be uniform, thereby improving a balance between the physical properties of the dip formed article produced using the carboxylic acid-modified nitrile-based copolymer.

According to an exemplary embodiment of the present invention, the polymerization of the carboxylic acid-modified nitrile-based copolymer may be performed while including an emulsifier, a polymerization initiator, an activator, and a chain transfer agent.

In a case where the polymerization of the carboxylic acid-modified nitrile-based copolymer is performed while including an emulsifier, the emulsifier may be one or more selected from the group consisting of an anionic surfactant, a nonionic surfactant, a cationic surfactant, and an amphoteric surfactant, and as a specific example, may be one or more anionic surfactants selected from the group consisting of alkylbenzene sulfonate, aliphatic sulfonate, sulfate ester of higher alcohol, α-olefin sulfonate, and alkyl ether sulfate. In addition, the emulsifier may be added in an amount of 0.3 parts by weight to 10 parts by weight, 0.8 parts by weight to 8 parts by weight, or 1.5 parts by weight to 8 parts by weight, based on 100 parts by weight of a total content of the monomer mixture, and within this range, the polymerization stability is excellent and the amount of bubbles generated is small, which is effective in production of a dip formed article.

In addition, the polymerization of the carboxylic acid-modified nitrile-based copolymer is performed while including a polymerization initiator, the polymerization initiator may be an oxidation-reduction initiator or a thermoinitiator. The oxidation-reduction initiator may include one or two or more selected from the group consisting of sodium bisulfite, sodium sulfite, ascorbic acid, and sodium formaldehyde sulfoxylate, and as a specific example, ascorbic acid may be used. The oxidation-reduction initiator may be added in an amount of 0.001 parts by weight to 5.0 parts by weight, 0.01 parts by weight to 4.0 parts by weight, or 0.05 parts by weight to 3.0 parts by weight, based on 100 parts by weight of the total content of the monomer mixture, and within this range, a polymerization rate may be adequately maintained.

The thermoinitiator may include one or two or more selected from the group consisting of inorganic peroxide such as sodium persulfate, potassium persulfate, ammonium persulfate, potassium perphosphate, or hydrogen peroxide, organic peroxide such as t-butyl peroxide, cumene hydroperoxide, p-mentane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, or t-butyl peroxy isobutylate, azobisisobutyronitrile, azobis-2,4-dimethylvaleronitrile, azobiscyclohexanecarbonitrile, and methyl azobisisobutyrate, as a specific example, may be inorganic peroxide, and as a more specific example, may be potassium persulfate. The thermoinitiator may be added in an amount of 0.01 parts by weight to 2.0 parts by weight, 0.02 parts by weight to 1.5 parts by weight, or 0.05 parts by weight to 1.0 part by weight, based on 100 parts by weight of the total content of the monomer mixture, and within this range, in a case where the thermoinitiator is used together with the oxidation-reduction initiator, a polymerization rate may be adequately maintained.

In addition, in a case where the polymerization of the carboxylic acid-modified nitrile-based copolymer is performed while including an activator, the activator may be one or more selected from the group consisting of sodium formaldehyde sulfoxylate, sodium ethylenediamineteraacetate, ferrous sulfate, dextrose, sodium pyrophosphate, and sodium sulfite. The activator may be added in an amount of 0.01 parts by weight to 2.0 parts by weight, 0.02 parts by weight to 1.5 parts by weight, or 0.05 parts by weight to 1.0 part by weight, based on 100 parts by weight of the total content of the monomer mixture, and within this range, a polymerization rate may be adequately maintained.

In addition, in a case where the polymerization of the carboxylic acid-modified nitrile-based copolymer is performed while including a chain transfer agent, the chain transfer agent may be one or two or more selected from the group consisting of α-methylstyrene dimer; mercaptans such as t-dodecyl mercaptan, n-dodecyl mercaptan, and octyl mercaptan; a halogenated hydrocarbon such as carbon tetrachloride, methylene chloride, or methylene bromide; and a sulfur-containing compound such as tetraethyl thiuram disulfide, dipentamethylene thiuram disulfide, or diisopropyl xanthogen disulfide, as a specific example, may be mercaptans, and as a more specific example, may be t-dodecyl mercaptan. In addition, the chain transfer agent may be added in an amount of 0.1 parts by weight to 2 parts by weight, 0.2 parts by weight to 1.5 parts by weight, or 0.3 parts by weight to 1.0 part by weight, based on 100 parts by weight of the total content of the monomer mixture, and within this range, the polymerization stability is excellent and the physical properties of the dip formed article are excellent when the dip formed article is produced after the polymerization.

In addition, according to an exemplary embodiment of the present invention, the polymerization of the carboxylic acid-modified nitrile-based copolymer may be performed in water, as a specific example, in deionized water, that is a medium, and may be performed while further including an additive such as a chelating agent, a dispersing agent, a pH adjuster, a deoxidizer, a particle size modifier, an antioxidant, or an oxygen scavenger, in order to secure ease of polymerization.

According to an exemplary embodiment of the present invention, the additive such as the emulsifier, the polymerization initiator, or the chain transfer agent may be added at the same time, or separately added to the polymerization reactor, together with the monomer mixture, and each addition may be continuously performed.

In addition, according to an exemplary embodiment of the present invention, the polymerization of the carboxylic acid-modified nitrile-based copolymer may be performed at 10° C. to 90° C., 20° C. to 80° C., or 25° C. to 75° C., and within this range, the stability of the latex is excellent.

Meanwhile, according to an exemplary embodiment of the present invention, a method of preparing the carboxylic acid-modified nitrile-based copolymer latex may include a step of obtaining carboxylic acid-modified nitrile-based copolymer latex by terminating a polymerization reaction. The termination of the polymerization reaction of the carboxylic acid-modified nitrile-based copolymer may be performed when a polymerization conversion ratio is 90% or more, 91% or more, or 92% to 99.9%, and may be performed by adding a polymerization terminator, a pH adjuster, or an antioxidant. In addition, the method of preparing carboxylic acid-modified nitrile-based copolymer latex may further include a step of removing unreacted monomers by a deodorization and concentration process after the termination of the reaction.

In addition, according to an exemplary embodiment of the present invention, the step of adding and mixing of the prepared phenolic emulsifier to the prepared carboxylic acid-modified nitrile-based copolymer latex is a step for preparing a latex composition for dip forming from carboxylic acid-modified nitrile-based copolymer latex. In this case, the type and content of the phenolic emulsifier may be the same as described above. In addition, the phenolic emulsifier may be different from the emulsifier to be added at the time of the polymerization described above.

According to an exemplary embodiment of the present invention, the phenolic emulsifier is mixed with the prepared carboxylic acid-modified nitrile-based copolymer latex, such that the syneresis time is increased, and a stress (modulus) of the dip formed article is improved. On the other hand, in a case where the phenolic emulsifier is added at the time of preparing carboxylic acid-modified nitrile-based copolymer latex, rather than being mixed with the prepared carboxylic acid-modified nitrile-based copolymer latex, the particles in the carboxylic acid-modified nitrile-based copolymer latex are decreased in size, which may cause a reduction of the syneresis time.

In addition, according to an exemplary embodiment of the present invention, in the step of adding and mixing of the phenolic emulsifier to the prepared carboxylic acid-modified nitrile-based copolymer latex, the ASE thickener is further included, such that an acid group of the ASE thickener is neutralized and swollen while being interacted with water, and a viscosity of the latex composition for dip forming is thus increased to further increase the syneresis time. By mixing the ASE thickener with the phenolic emulsifier, a stress (modulus) is reduced, such that wearing comfort may be improved. In addition, a tensile strength of the formed article produced using the latex composition for dip forming is increased, such that the physical properties of the dip formed article may be improved.

According to the present invention, there is provided the dip formed article including a layer derived from a latex composition for dip forming. The formed article may be an article formed by dip forming the latex composition for dip forming, and may be a formed article including a layer derived from a latex composition for dip forming, which is formed of the latex composition for dip forming by dip forming. The method for producing a formed article may include a step of immersing the latex composition for dip forming by a direct immersion method, an anode coagulation immersion method, and a Teague coagulation immersion method. As a specific example, the method may be performed by an anode coagulation immersion method, and in this case, a dip formed article having a uniform thickness may be produced.

As a specific example, the method for producing a formed article may include: a step (S100) of attaching a coagulant to a dip mold; a step (S200) of immersing a latex composition for dip forming in the coagulant-attached dip mold to form a layer derived from the latex composition for dip forming, that is, a dip molded layer; and a step (S300) of heating the dip molded layer in order to cross-link the latex composition for dip forming.

The step (S100) is a step of attaching a coagulant onto a surface of a dip mold by immersing the dip mold in a coagulant solution to form a coagulant on the dip mold. The coagulant solution is a solution obtained by dissolving a coagulant in water, alcohol, or a mixture thereof, and a content of the coagulant in the coagulant solution may be 5 wt % to 50 wt %, 7 wt % to 45 wt %, or 10 wt % to 40 wt %, with respect to the total content of the coagulant solution. As an example, the coagulant may be one or more selected from the group consisting of metal halide such as barium chloride, calcium chloride, magnesium chloride, zinc chloride, or aluminum chloride; nitrate such as barium nitrate, calcium nitrate, or zinc nitrate; acetate such as barium acetate, calcium acetate, or zinc acetate; and sulfate such as calcium sulfate, magnesium sulfate, or aluminum sulfate. As a specific example, the coagulant may be calcium chloride or calcium nitrate.

In addition, the step (S200) may be a step of immersing the coagulant-attached dip mold in the latex composition for dip forming according to the present invention, and taking out the mold, to form a dip molded layer on the dip mold.

In addition, the step (S300) may be a step of performing curing of the latex composition for dip forming by heating the dip molded layer formed on the dip mold and cross-linking the latex composition for dip forming to obtain a dip formed article.

Thereafter, the dip molded layer cross-linked by the heat treatment is peeled off from the dip mold, thereby obtaining a dip formed article.

According to an exemplary embodiment of the present invention, the dip formed article may be a glove such as a surgical glove, an examination glove, an industrial glove, or a household glove, a condom, a catheter, or a health care product.

Hereinafter, the present invention will be described in more detail by Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of Carboxylic Acid-Modified Nitrile-Based Copolymer Latex>

After a 10 L high-pressure reactor equipped with a thermometer, a cooler, an inlet for nitrogen gas, and allowing for continuous addition of a monomer, an emulsifier, and a polymerization initiator was replaced with nitrogen, 100 parts by weight of a monomer mixture consisting of 30 wt % of acrylonitrile, 65 wt % of 1,3-butadiene, and 5 wt % of methacrylic acid, 2.5 parts by weight of sodium alkylbenzene sulfonate, 0.5 parts by weight of t-dodecyl mercaptan, and 140 parts by weight of ion exchange water were added to the reactor, and then a temperature of the reactor was increased to 38° C. After the temperature was increased, 0.3 parts by weight of potassium persulfate as a polymerization initiator was added to the resulting mixture, and 0.1 parts by weight of sodium dimethyl dithiocarbamate was added thereto when the polymerization conversion ratio was 95% to stop polymerization. Subsequently, unreacted monomers were removed by a deodorization process, and 0.5 parts by weight of ammonia water, 0.5 parts by weight of an antioxidant, and 0.1 parts by weight of a defoaming agent were added, thereby obtaining carboxylic acid-modified nitrile-based copolymer latex having a solid content of 45 wt % and a pH of 8.5.

An average particle size and a glass transition temperature of the prepared carboxylic acid-modified nitrile-based copolymer latex was measured. The average particle size measured by a laser scattering analyzer (Nicomp) was 120 nm, and the glass transition temperature measured by differential scanning calorimetry was −30° C.

<Preparation of Latex Composition for Dip Forming>

To 100 parts by weight (based on a solid content) of the thus-obtained carboxylic acid-modified nitrile-based copolymer latex, 0.1 parts by weight (a content of an active component based on a solid content) of a 5% phenolic emulsifier (n=16) (Stepan Company, POLYSTEP® TSP-16) diluted with distilled water and represented by the following Formula 4, 2.0 parts by weight of a 3% potassium hydroxide solution diluted with distilled water, and secondary distilled water were added, thereby obtaining a latex composition for dip forming having a solid content of 20 wt % and a pH of 10.

[Formula 4]

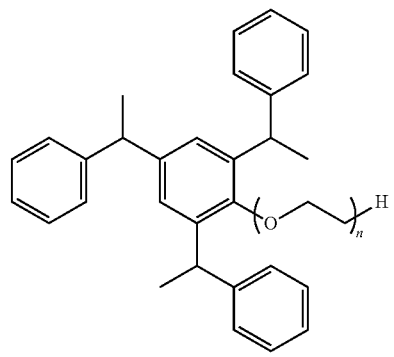

<Production of Dip Formed Article>

15 parts by weight of calcium nitrate, 84.5 parts by weight of distilled water, and 0.5 parts by weight of a wetting agent (Teric 320, Huntsman Corporation, Australia) were mixed to prepare a coagulant solution. A hand-shaped ceramic mold was immersed in the prepared coagulant solution for 1 minute, and then taken out and dried at 80° C. for 4 minutes to apply the coagulant onto the hand-shaped mold.

Next, the coagulant-applied mold was immersed in the thus-obtained latex composition for dip forming for 1 minute, and then taken out and dried at 80° C. for 3 minutes. Subsequently, the mold was immersed in water for 3 minutes for leaching, and the mold was again dried at 80° C. for 3 minutes and then cross-linked at 130° C. for 20 minutes. The cross-linked dip molded layer was peeled off from the hand-shaped mold, thereby obtaining a glove-shaped dip formed article.

Example 2

Example 2 was carried out in the same manner as that of Example 1, except that the phenolic emulsifier (n=16) (Stepan Company, POLYSTEP® TSP-16) represented by Formula 4 was added in an amount of 0.5 parts by weight instead of 0.1 parts by weight at the time of the preparation of a latex composition for dip forming.

Example 3

Example 3 was carried out in the same manner as that of Example 1, except that the phenolic emulsifier (n=16) (Stepan Company, POLYSTEP® TSP-16) represented by Formula 4 was added in an amount of 1.0 part by weight instead of 0.1 parts by weight at the time of the preparation of a latex composition for dip forming.

Example 4

Example 4 was carried out in the same manner as that of Example 1, except that the phenolic emulsifier (n=16) (Stepan Company, POLYSTEP® TSP-16) represented by Formula 4 was added in an amount of 4.0 parts by weight instead of 0.1 parts by weight at the time of the preparation of a latex composition for dip forming.

Example 5

Example 5 was carried out in the same manner as that of Example 1, except that 1.0 part by weight of a phenolic emulsifier (n=25) (Stepan Company, POLYSTEP® TSP-2580) represented by Formula 4 was added instead of 0.1 parts by weight of the phenolic emulsifier (n=16) (Stepan Company, POLYSTEP® TSP-16) represented by Formula 4 at the time of the preparation of a latex composition for dip forming.

Example 6

Example 6 was carried out in the same manner as that of Example 1, except that 0.1 parts by weight (based on a solid content) of an alkali soluble emulsion (ASE) thickener was added to 100 parts by weight (based on a solid content) of the thus-obtained carboxylic acid-modified nitrile-based copolymer latex at the time of the preparation of a latex composition for dip forming. At this time, as the ASE thickener, an alkali soluble emulsion (ASE) thickener (BASF SE, Sterocoll® FD) including a copolymer represented by the following Formula 5 (x and y each are 10 to 1000) was used after being subjected to dilution with distilled water so that a solid content thereof became 10 wt %.

[Formula 5]

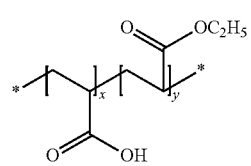

Example 7

Example 7 was carried out in the same manner as that of Example 6, except that the ASE thickener was added in an amount of 0.2 parts by weight (based on a solid content) instead of 0.1 parts by weight (based on a solid content).

Comparative Example 1

Comparative Example 1 was carried out in the same manner as that of Example 1, except that a phenolic emulsifier was not used at the time of the preparation of a latex composition for dip forming.

Comparative Example 2

Comparative Example 2 was carried out in the same manner as that of Example 1, except that the phenolic emulsifier (n=16) (Stepan Company, POLYSTEP® TSP-16) represented by Formula 4 was added in an amount of 0.01 parts by weight instead of 0.1 parts by weight at the time of the preparation of the latex composition for dip forming.

Comparative Example 3

Comparative Example 3 was carried out in the same manner as that of Example 1, except that the phenolic emulsifier (n=16) (Stepan Company, POLYSTEP® TSP-16) represented by Formula 4 was added in an amount of 0.05 parts by weight instead of 0.1 parts by weight at the time of the preparation of the latex composition for dip forming.

Comparative Example 4

Comparative Example 4 was carried out in the same manner as that of Example 1, except that the phenolic emulsifier (n=16) (Stepan Company, POLYSTEP® TSP-16) represented by Formula 4 was added in an amount of 10 parts by weight instead of 0.1 parts by weight at the time of the preparation of the latex composition for dip forming.

Comparative Example 5

Comparative Example 5 was carried out in the same manner as that of Example 1, except that 0.5 parts by weight of Triton X-100 was added instead of 0.1 parts by weight of the phenolic emulsifier (n=16) (Stepan Company, POLYSTEP® TSP-16) represented by Formula 4 at the time of the preparation of the latex composition for dip forming.

Comparative Example 6

Comparative Example 6 was carried out in the same manner as that of Example 1, except that 1.0 part by weight of ELOTANT ESL02026 (Sodium lauryl ether sulfate (SLES)) was added instead of 0.1 parts by weight of the phenolic emulsifier (n=16) (Stepan Company, POLYSTEP® TSP-16) represented by Formula 4 at the time of the preparation of the latex composition for dip forming.

Comparative Example 7

<Preparation of Carboxylic Acid-Modified Nitrile-Based Copolymer Latex>

After a 10 L high-pressure reactor equipped with a thermometer, a cooler, an inlet for nitrogen gas, and allowing for continuous addition of a monomer, an emulsifier, and a polymerization initiator was replaced with nitrogen, 100 parts by weight of a monomer mixture consisting of 30 wt % of acrylonitrile, 65 wt % of 1,3-butadiene, and 5 wt % of methacrylic acid, 2.5 parts by weight of sodium alkylbenzene sulfonate, 0.5 parts by weight of t-dodecyl mercaptan, 140 parts by weight of ion exchange water, and 0.5 parts by weight of a phenolic emulsifier (n=16) (Stepan Company, POLYSTEP® TSP-16) represented by Formula 4 were added to the reactor, and then a temperature of the reactor was increased to 38° C. After the temperature was increased, 0.3 parts by weight of potassium persulfate as a polymerization initiator was added to the resulting mixture, and 0.1 parts by weight of sodium dimethyl dithiocarbamate was added thereto when the polymerization conversion ratio was 95% to stop polymerization. Subsequently, unreacted monomers were removed by a deodorization process, and 0.5 parts by weight of ammonia water, 0.5 parts by weight of an antioxidant, and 0.1 parts by weight of a defoaming agent were added, thereby obtaining carboxylic acid-modified nitrile-based copolymer latex having a solid content of 45 wt % and a pH of 8.5.

An average particle size and a glass transition temperature of the prepared carboxylic acid-modified nitrile-based copolymer latex was measured. The average particle size measured by a laser scattering analyzer (Nicomp) was 120 nm, and the glass transition temperature measured by differential scanning calorimetry was −30° C.

<Preparation of Latex Composition for Dip Forming>

To 100 parts by weight (based on a solid content) of the thus-obtained carboxylic acid-modified nitrile-based copolymer latex, 2.0 parts by weight of a 3% potassium hydroxide solution diluted with distilled water, and secondary distilled water were added, thereby obtaining a latex composition for dip forming having a solid content of 20 wt % and a pH of 10.

<Production of Dip Formed Article>

15 parts by weight of calcium nitrate, 84.5 parts by weight of distilled water, and 0.5 parts by weight of a wetting agent (Teric 320, Huntsman Corporation, Australia) were mixed to prepare a coagulant solution. A hand-shaped ceramic mold was immersed in the prepared coagulant solution for 1 minute, and then taken out and dried at 80° C. for 4 minutes to apply the coagulant onto the hand-shaped mold.

Next, the coagulant-applied mold was immersed in the thus-obtained latex composition for dip forming for 1 minute, and then taken out and dried at 80° C. for 3 minutes. Subsequently, the mold was immersed in water for 3 minutes for leaching, and the mold was again dried at 80° C. for 3 minutes and then cross-linked at 130° C. for 20 minutes. The cross-linked dip molded layer was peeled off from the hand-shaped mold, thereby obtaining a glove-shaped dip formed article.

Experimental Example

In order to compare the physical properties of the dip formed articles produced in Examples 1 to 7 and Comparative Examples 1 to 7, a tensile strength, a stress at 300% and 500%, and syneresis of each dip formed article were measured, and the results are shown in Tables 1 and 2.

Tensile strength (MPa), Stress (MPa) at 300% elongation, and Stress (MPa) at 500% elongation: A dumbbell-shaped specimen was prepared according to EN 455-2. Subsequently, the specimen was pulled up at an elongation rate of 500 mm/min, and then stresses at 300% and 500% elongation, and a tensile strength at the time of breaking were measured.

Syneresis (sec): In order to check syneresis time, the coagulant-applied mold was immersed in the latex composition for dip forming for 1 minute, pulled up, and dried at 120° C. for 4 minutes, and then the mold was again immersed in water for 3 minutes. Next, the time of dropping of water droplets was checked at 120° C. for 4 minutes. The longer the syneresis time, the better the syneresis properties.

TABLE 1

| Classification | Example | | | | | | |
|---|---|---|---|---|---|---|---|
| | 1 | 2 | 3 | 4 | 5 | 6 | 7 |
| Tensile strength (MPa) | 36.1 | 35.2 | 36.9 | 36.4 | 40.4 | 36.7 | 37.2 |
| 300% Modulus (MPa) | 4.11 | 3.87 | 3.60 | 2.98 | 3.91 | 4.12 | 4.18 |
| 500% Modulus (MPa) | 10.29 | 9.91 | 9.22 | 8.31 | 9.66 | 10.38 | 10.45 |
| Syneresis (sec) | 133 | 194 | 275 | 360 or longer | 252 | 360 or longer | 360 or longer |

TABLE 2

| Classification | Comparative Example | | | | | | |
|---|---|---|---|---|---|---|---|
| | 1 | 2 | 3 | 4 | 5 | 6 | 7 |
| Tensile strength (MPa) | 33.9 | 35.2 | 36.1 | 22.8 | 34.2 | 32.1 | 34.3 |
| 300% Modulus (MPa) | 4.20 | 4.25 | 4.18 | 2.15 | 4.12 | 4.72 | 4.19 |
| 500% Modulus (MPa) | 10.68 | 10.55 | 10.49 | 8.20 | 10.29 | 11.62 | 10.25 |
| Syneresis (sec) | 103 | 99 | 109 | 360 or longer | 62 | 41 | 150 |

Referring to Tables 1 and 2, it could be confirmed that, in Examples 1 to 7 according to the present invention, in a case where the phenolic emulsifier was included in the latex composition for dip forming, the stress was reduced without the reduction of the tensile strength, and the syneresis was significantly increased. Therefore, the workability was improved and the wearing comfort of the produced dip formed article was improved when the dip forming was performed by using the latex composition for dip forming according to the present invention.

In particular, it could be confirmed that, in a case where the ASE thickener was further included in the latex composition for dip forming in addition to the phenolic emulsifier, the tensile strength and the syneresis were significantly increased.

On the other hand, it could be confirmed that, in Comparative Example 1 in which no phenolic emulsifier was included, the tensile strength and the syneresis were reduced.

In addition, it could be confirmed that, in Comparative Examples 2 to 4 in which the content of the phenolic emulsifier was out of an adequate range, the tensile strength or the syneresis was reduced.

In addition, it could be confirmed that, in Comparative Examples 5 and 6 in which a general phenolic emulsifier was used instead of the phenolic emulsifier according to the present invention, all the tensile strength, the stress, and the syneresis were reduced.

In addition, it could be confirmed that, in Comparative Example 7 in which the phenolic emulsifier according to the present invention was added at the time of the polymerization of the carboxylic acid-modified nitrile-based copolymer latex (not after the polymerization of the carboxylic acid-modified nitrile-based copolymer latex was completed), both the tensile strength and the stress were also reduced.

The invention claimed is:

1. A latex composition for dip forming, comprising:
carboxylic acid-modified nitrile-based copolymer latex;
a phenolic emulsifier; and
an alkali soluble emulsion (ASE) thickener, wherein the phenolic emulsifier is included in an amount of 0.08 parts by weight to 6 parts by weight (based on a solid content) based on 100 parts by weight of the carboxylic acid-modified nitrile-based copolymer latex, and wherein the ASE thickener is represented by the following Formula 3,

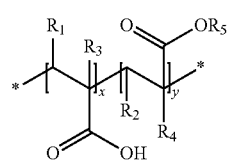

[Formula 3]

wherein, in Formula 3, $R_1$ and $R_2$ each independently represent hydrogen; $R_3$ and $R_4$ each independently represent hydrogen or a methyl group; $R_5$ represents an alkyl group having 1 to 4 carbon atoms; and x and y are each independently an integer selected from 10 to 1000; and wherein * refers to a linking position between repeating units represented by x and/or y or an end group in a copolymer, or in a case where * is the end group, * is hydrogen or an alkyl group having 1 to 4 carbon atoms.

2. The latex composition for dip forming of claim 1, wherein the phenolic emulsifier is represented by the following Formula 1,

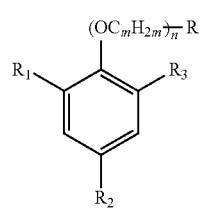

[Formula 1]

wherein, in Formula 1, $R_1$, $R_2$, and $R_3$ are each independently hydrogen, or substituted or unsubstituted linear or branched alkyl having 1 to 30 carbon atoms; at least one of $R_1$ to $R_3$ is substituted or unsubstituted linear or branched alkyl having 1 to 30 carbon atoms; R is hydrogen, a polymerizable functional group, an alkoxy group having 1 to 30 carbon atoms, an inorganic or organic salt, a nonionic group, or halogen; m is an integer of 1 to 20; and n is an integer of 1 to 100.

3. The latex composition for dip forming of claim 2, wherein in Formula 1, $R_1$, $R_2$, and $R_3$ are each independently hydrogen, or substituted or unsubstituted linear or branched alkyl having 1 to 10 carbon atoms; at least one of $R_1$ to $R_3$ is substituted or unsubstituted linear or branched alkyl having 1 to 30 carbon atoms; R is hydrogen, a polymerizable functional group, an alkoxy group having 1 to 10 carbon atoms, an inorganic or organic salt, a nonionic group, or halogen; m is an integer of 1 to 5; and n is an integer of 8 to 25.

4. The latex composition for dip forming of claim 2, wherein a substituent substitutable for the linear or branched alkyl is one or more selected from the group consisting of linear or branched alkyl having 1 to 30 carbon atoms; cycloalkyl having 3 to 30 carbon atoms; aryl having 6 to 30 carbon atoms; and halogen.

5. The latex composition for dip forming of claim 1, wherein the phenolic emulsifier is represented by the following Formula 2,

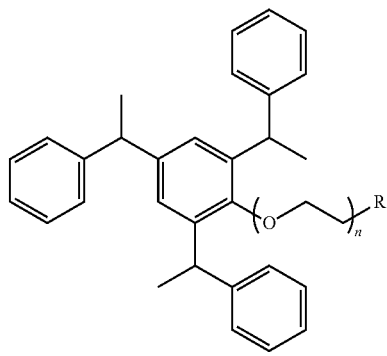

[Formula 2]

wherein, in Formula 2, R is hydrogen, a polymerizable functional group, an alkoxy group having 1 to 10 carbon atoms, an inorganic or organic salt, a nonionic group, or halogen; and n is an integer of 1 to 100.

6. The latex composition for dip forming of claim 5, wherein the polymerizable functional group is one or more selected from the group consisting of (meth)acrylate; alkyl (meth)acrylate having 1 to 30 carbon atoms; and alkenyl (meth)acrylate having 2 to 30 carbon atoms.

7. The latex composition for dip forming of claim 1, wherein the phenolic emulsifier is included in an amount of 0.1 parts by weight to 4 parts by weight (based on a solid content) based on 100 parts by weight of the carboxylic acid-modified nitrile-based copolymer latex.

8. The latex composition for dip forming of claim 1, wherein a number average molecular weight of the phenolic emulsifier is 200 g/mol to 50,000 g/mol.

9. A method for preparing athe latex composition for dip formingof claim 1, the method comprising:

preparing carboxylic acid-modified nitrile-based copolymer latex; and mixing the prepared carboxylic acid-modified nitrile-based copolymer latex with a phenolic emulsifier and an alkali soluble emulsion thickener, wherein in the mixing, the phenolic emulsifier is mixed in an amount of 0.08 parts by weight to 6 parts by weight (based on a solid content) based on 100 parts by weight of the carboxylic acid- modified nitrile-based copolymer latex.

10. The latex composition for dip forming of claim 1, wherein the ASE thickener is included in an amount of 0.01 parts by weight to 1.5 parts by weight (based on a solid content) based on 100 parts by weight of the carboxylic acid-modified nitrile-based copolymer latex.

\* \* \* \* \*